United States Patent
Landou et al.

(10) Patent No.: US 10,007,240 B2
(45) Date of Patent: Jun. 26, 2018

(54) ENHANCED ALARMING WITH BACNET OBJECTS

(71) Applicant: Siemens Industry, Inc., Alpharetta, GA (US)

(72) Inventors: Bruno P. Landou, Elmhurst, IL (US); Thomas Rule, Arlington Heights, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 736 days.

(21) Appl. No.: 14/451,655

(22) Filed: Aug. 5, 2014

(65) Prior Publication Data

US 2016/0041537 A1    Feb. 11, 2016

(51) Int. Cl.
| | |
|---|---|
| G05B 21/00 | (2006.01) |
| G05B 15/02 | (2006.01) |
| H04L 29/08 | (2006.01) |
| G08B 19/00 | (2006.01) |
| G08B 25/00 | (2006.01) |
| G08B 25/14 | (2006.01) |

(52) U.S. Cl.
CPC .............. *G05B 15/02* (2013.01); *G08B 19/00* (2013.01); *G08B 25/008* (2013.01); *G08B 25/14* (2013.01); *H04L 67/10* (2013.01)

(58) Field of Classification Search
CPC ..................................................... G05B 15/02
USPC ................................................. 700/275–306
See application file for complete search history.

(56) References Cited

U.S. PATENT DOCUMENTS

| 5,483,153 A | * | 1/1996 | Leeb | ...................... G01R 19/25 |
| | | | | 324/102 |
| 5,901,058 A | * | 5/1999 | Steinman | ............. G05B 19/408 |
| | | | | 700/1 |

(Continued)

FOREIGN PATENT DOCUMENTS

| EP | 0892327 A1 | 1/1999 |
| WO | 2013/049031 A1 | 4/2013 |

(Continued)

OTHER PUBLICATIONS

Kastner, Wolfgang, et al. "Communication systems for building automation and control." Proceedings of the IEEE 93.6 (2005): pp. 1178-1203.*

(Continued)

*Primary Examiner* — Satish Rampuria (57) ABSTRACT

Management systems, methods, and mediums are provided. A method includes monitoring a value of a data point associated with a device in an automation system using a set of pairs of event enrollment objects and notification class objects configured to generate and communicate an alarm according to a first protocol. Each of the pairs of objects corresponds to one of a set of offsets defined according to a second protocol. The method also includes writing property values of the pairs of objects for different alarm monitoring modes using a set of command objects. Additionally, the method includes generating and communicating, in response to detecting the value for the data point meeting conditions in at least one of the event enrollment objects, an alarm according to a notification class object paired with the at least one event enrollment object.

25 Claims, 6 Drawing Sheets

(56) References Cited

U.S. PATENT DOCUMENTS

| | | | | |
|---|---|---|---|---|
| 6,119,125 | A * | 9/2000 | Gloudeman | G06F 8/20 |
| 8,421,588 | B1 * | 4/2013 | Ross | G08C 17/02 |
| | | | | 340/5.1 |
| 9,418,543 | B1 * | 8/2016 | Ross | G08C 17/02 |
| 2005/0027182 | A1 * | 2/2005 | Siddiqui | A61B 5/14532 |
| | | | | 600/365 |
| 2008/0244014 | A1 * | 10/2008 | Britton | H04L 51/36 |
| | | | | 709/206 |
| 2012/0259466 | A1 * | 10/2012 | Ray | G05B 15/02 |
| | | | | 700/275 |
| 2013/0082832 | A1 * | 4/2013 | Anderson, Jr. | G05B 15/02 |
| | | | | 340/501 |

FOREIGN PATENT DOCUMENTS

| | | |
|---|---|---|
| WO | 2013 049131 A1 | 4/2013 |
| WO | 2013/049007 A1 | 4/2014 |

OTHER PUBLICATIONS

Bushby, Steven T. "BACnetTM: a standard communication infrastructure for intelligent buildings." Automation in Construction 6.5-6 (1997): pp. 529-540.*

Fernbach, Andreas, Wolfgang Granzer, and Wolfgang Kastner. "Interoperability at the management level of building automation systems: a case study for BACnet and OPC UA." Emerging Technologies & Factory Automation (ETFA), 2011 IEEE 16th Conference on. IEEE, 2011.pp. 1-8.*

PCT Search Report, dated Nov. 9, 2015, for PCT Application PCT/US2015/043779, 10 pages.

* cited by examiner

| Property Name | | Property Value |
|---|---|---|
| Event_Type ← 405 | | FLOATING_LIMIT (event occurs if the referenced property leaves a range of values determined by the current value of the Setpoint_Reference, High_Diff_Limit, Low_Diff_Limit, and Deadband.) — 410 |
| Notify_Type | | Alarms |
| Event_Parameters 415 | Time_Delay | Time, in seconds, that the conditions monitored must persist before an event notification is issued |
| | Setpoint_Reference | The current value of an analog point chosen to provide a setpoint value (BacnetDeviceObjectPropertyReference) |
| | Low_Diff_Limit | Starting in the NORMAL state, if the value of the referenced property becomes less than Setpoint_Reference-Low_Diff_Limit for a period greater than the Time_Delay parameter, the Event Enrollment object sets the Event_State property to the LOW_LIMIT state and generates a TO-OFFNORMAL transition. |
| | High_Diff_Limit | Starting in the NORMAL state, if the value of the referenced property becomes greater than Setpoint_Reference + High_Diff_Limit for a period of time greater than the Time_Delay parameter, the Event Enrollment object sets the Event_State property to the HIGH_LIMIT state and generates a TO-OFFNORMAL transition. |
| | Deadband | The Event Enrollment object generates a TO-NORMAL transition and sets the Event_State property to NORMAL when the referenced property returns to a value less than Setpoint_Reference + High_Diff_Limit-Deadband for a period of time greater than the Time_Delay parameter. In each case, the event notification shall show an 'Event Type' of FLOATING_LIMIT. The Event Enrollment object generates a TO-NORMAL transition and sets the Event_State property to NORMAL when the referenced property returns to a value greater that Setpoint_Reference-Low_Diff_Limit + Deadband for a period of time greater than the Time_Delay parameter. |
| Object_Property_Reference | | The point and point property being monitored (BacnetDeviceObject PropertyReference), i.e. the point set up for Enhanced Alarming |
| Event_Enable ← 420 | | Three flags enabling notifications for TO-OFFNORMAL, TO-FAULT, and TO-NORMAL transitions |
| Notification_Class | | NC object instance number |
| Event_Message_Texts | | Text |

| Property Name | Property Value |
|---|---|
| Priority 505 | Array of 3 unsigned values conveys the priority to be used for event notifications for TO-OFFNORMAL, TO-FAULT, and TO-NORMAL events. Priorities shall range from 0-255 inclusive. |
| Ack_Required 510 | Three flags that represent whether acknowledgment shall be required in notifications generated for TO-OFFNORMAL, TO-FAULT, and TO-NORMAL event transitions. |
| Recipient_List 515 | List of BACnetDestination |

| Property Name | Property Value |
|---|---|
| Present_Value | Index value (1..6 range as in 6 modes) into Action property array |
| Action | Array of 6 action lists (as many action lists as there are Enhanced Alarm modes), where each action list holds two BACnet Action Commands to trigger Command Object #2 and Command Object #3 when commanding a new mode. Post_Delay component of 2nd BACnet Action Command is set to the value of Level Delay. |
| Action_Text | Array of 6 character strings (as many strings as there are Enhanced Alarm modes) to hold the names of the modes, e.g. "Day", "Night", "Special2", "Special3", "Special4", "Special5". |

615 → Present_Value
630 → Action

| Property Name | Property Value |
|---|---|
| Present_Value | Index value (1..6 range as in 6 modes) into Action property array |
| Action | Array of 6 action lists (as many action lists as there are Enhanced Alarm modes), where each action list holds enough BACnetActionCommand elements to reprogram the 6 Event Enrollment/Notification Class pairs of objects when commanding a new mode |
| Action_Text | Array of 6 character strings (as many strings as there are Enhanced Alarm modes) to hold the names of the modes, e.g. "Day", "Night", "Special2", "Special3", "Special4", "Special5". |

620 → Present_Value
635 → Action

| Property Name | Property Value |
|---|---|
| Present_Value | Index value (1..6 range as in 6 modes) into Action property array |
| Action | Array of 6 action lists (as many action lists as there are Enhanced Alarm modes), where each action list holds enough BACnetActionCommand elements to reprogram the 6 Event Enrollment objects when commanding a new mode |
| Action_Text | Array of 6 character strings (as many strings as there are Enhanced Alarm modes) to hold the names of the modes, e.g. "Day", "Night", "Special2", "Special3", "Special4", "Special5". |

625 → Present_Value
640 → Action

ENHANCED ALARMING WITH BACNET OBJECTS

TECHNICAL FIELD

The present disclosure is directed, in general, to management systems and, more particularly, to enabling enhanced alarming in a building management system using building automation and controls network (BACnet) communications protocol objects.

BACKGROUND OF THE DISCLOSURE

Building management or automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors, and alarm actuators dispersed throughout an entire building or campus. Fire safety systems also include widely dispersed devices in the form of smoke alarms, pull stations, and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. The devices within building automation systems may communicate using one or more open or closed protocols. One example of an open protocol is the building automation and controls network (BACnet) communications protocol. The BACnet protocol allows for communication in building automation and control systems for HVAC, lighting, security and safety system applications.

However, given that BACnet is an open protocol, BACnet may lack design and sophistication in a number of monitoring and control applications. For example, BACnet may not include enhanced alarming capabilities that may be available on one or more other closed protocols.

SUMMARY OF THE DISCLOSURE

Various disclosed embodiments relate to systems and methods for enabling enhanced alarming in a building management system using BACnet objects.

Various embodiments include management systems, methods, and mediums. A method includes monitoring a value of a data point associated with a device in an automation system using a set of pairs of event enrollment objects and notification class objects configured to generate and communicate an alarm according to a first protocol. Each of the pairs of objects corresponds to one of a set of offsets defined according to a second protocol. The method also includes writing property values of the pairs of objects for different alarm monitoring modes using a set of command objects. Additionally, the method includes generating and communicating, in response to detecting the value for the data point meeting conditions in at least one of the event enrollment objects, an alarm according to a notification class object paired with the at least one event enrollment object in alarm.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 6A-6C illustrate exemplary command objects for enabling enhanced alarming in accordance with disclosed embodiments.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged device or system.

Embodiments of the present disclosure recognize and take into account that enhanced alarming is a powerful and sophisticated alarming scheme that was designed and implemented in building automation system products based on a proprietary protocol, for example, the P2 protocol for Siemens Apogee® Insight® building automation system products. Enhanced alarming allows for customizing of alarm conditions. For example, enhanced alarming allows for customizing urgency of an alarm, building in of triggering conditions to reduce a probability of false alarm conditions, inclusion of different operator messages with an alarm, and different modes of operation for handling alarm conditions differently during, for example, night time versus day time or other special alarm monitoring modes.

Embodiments of the present disclosure recognize and take into account enhanced alarming has not been supported in building automation system products that use the open BACnet protocol. Accordingly, embodiments of the present disclosure provide systems and methods for implementing enhanced alarming using standard BACnet objects. Embodiments of the present disclosure provide identification and programming for a set of BACnet objects to interact to produce enhanced alarming alarms according to user-defined parameters.

Figure 1:
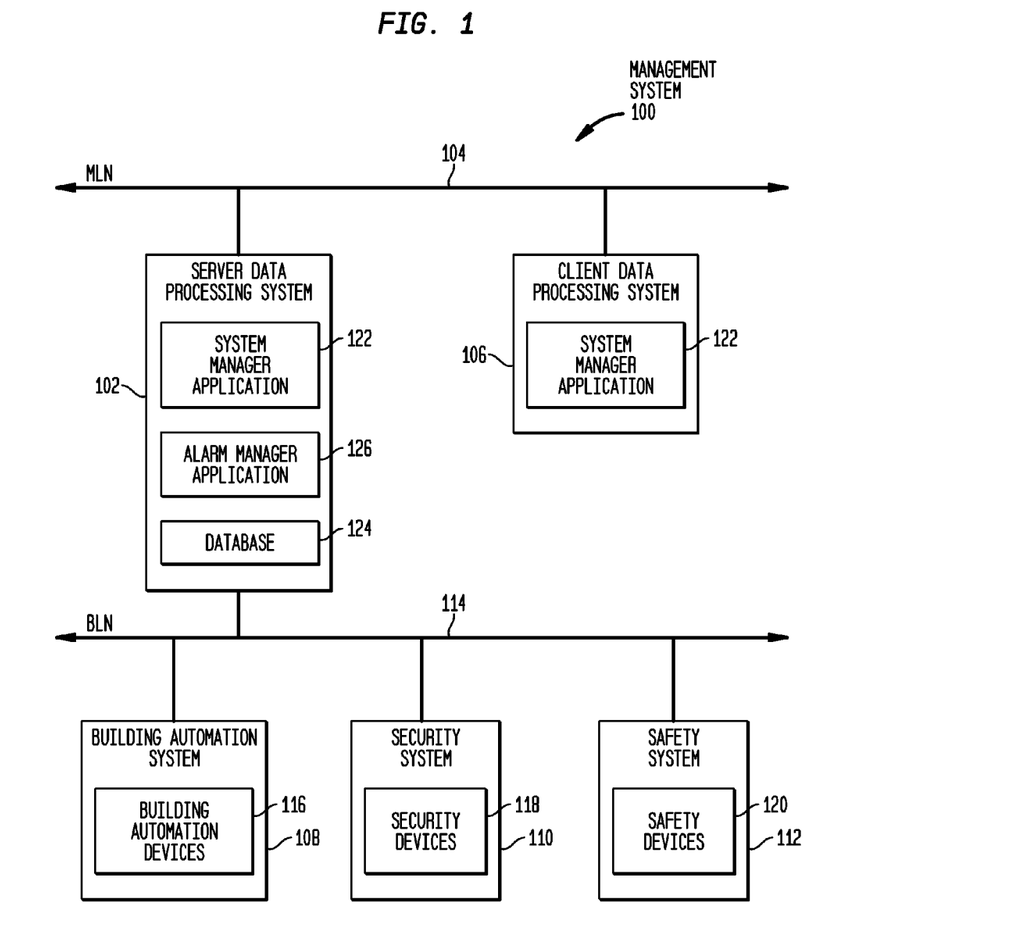
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security devices 118 and safety devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor, or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review, and control various points and devices in the management system 100. The system manager application 122 may include, for example, without limitation, executable files, user-layout-definition files, graphics control modules, an infrastructure interface, and/or a number of software extensions.

The server data processing system 102 includes a database 124 that stores information about the devices 116-120 within the management system 100. A database 124 includes one or more data models of data points, devices, and other objects in the management system 100. For example, the database 124 may store values for one or more inputs and outputs of devices in the BAS 108 (e.g., temperature, alarm status, humidity). These values may be referred to as a point or data point. As referenced herein, a "point" or "data point" may be: (i) any physical input or output to or from a respective controller, field device, sensor, or actuator, or (ii) any virtual point associated with a control application or logic object within a field controller or field panel of the systems 108-112 that is measured, monitored, or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects in the management system 100 include anything that creates, processes, or stores information regarding data points or otherwise serves as a software proxy for a data point, such as analog, binary, or multistate inputs and outputs of physical devices (e.g., BAS controllers, field panels, sensors, actuators, cameras, etc.). Objects may also include data files, such as control schedules, trend reports, calendars, and the like. A BACnet object is an object that is generated and communicated with using BACnet communication protocol services.

In various embodiments, the database 124 includes hierarchy definitions that identify relationships between objects in the system. For example, a hierarchy may include a folder for a "floor" in a building with multiple child folders in the form of "rooms". Each "room" object, in turn, may have several child objects, such as "ventilation damper", "smoke detector", and "temperature sensor". Such hierarchy definitions among objects may employ conventional BACnet structures and may take many other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those representative of the devices 116-120.

The server data processing system 102 includes an alarm manager application 126 to monitor objects in the management system 100 and generate enhanced alarming alarms according to defined parameters for generating the alarms. The alarm manager application 126 is a software application that runs on the server data processing system 102. The alarm manager application 126 includes functionality for identifying alarms generated within the management system 100 and including information with the generated alarms. The alarm manager application 126 also programs BACnet objects to provide the enhanced alarming alarms for systems and devices in the management system 100 that operate according to the BACnet protocol.

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other data objects in the system.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
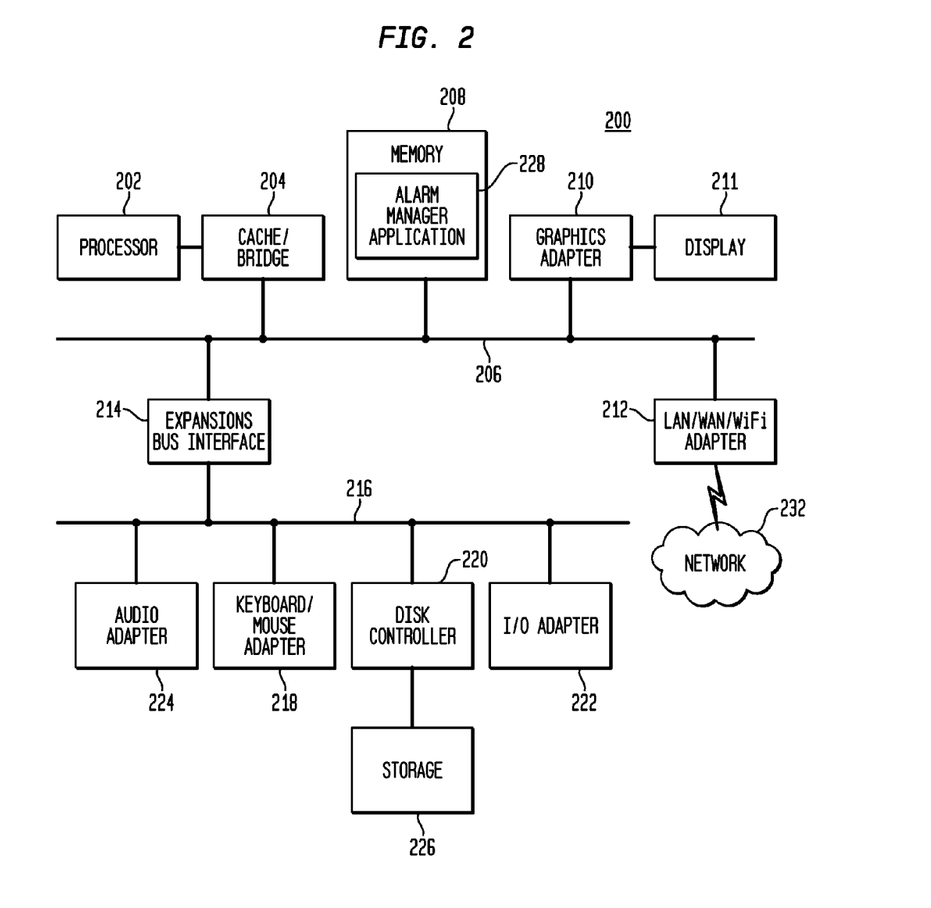
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106 in FIG. 1.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement enhanced alarming capabilities using BACnet objects to generate alarms associated with devices monitored and/or controlled within a building.

LAN/WAN/Wifi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system.

In various embodiments of the present disclosure, the data processing system 200 executes program code of the alarm manager application 228 in the memory 208. The alarm manager application 228 is an example of one embodiment of the alarm manager application 126 in FIG. 1. For example, the processor 202 executes program code of the alarm manager application 228 to generate and program BACnet objects associated with devices in the management system 100 to implement enhanced alarming according to user-defined parameters.

The illustration of the data processing system 200 in FIG. 2 is intended as an illustrative example of various embodiments of the present disclosure and is not meant to imply physical or architectural limitations to the manner in which different illustrative embodiments may be implemented. For example, one data processing system may perform the generation and programming of BACnet objects. A different data processing system may store and maintain programmed BACnet objects and monitor one or more data points in the management system 100 to determine whether to generate an alarm and how to commutate the alarm. A third data processing system may then receive a notification of the alarm and present the notification of the alarm to a user.

Figure 3:
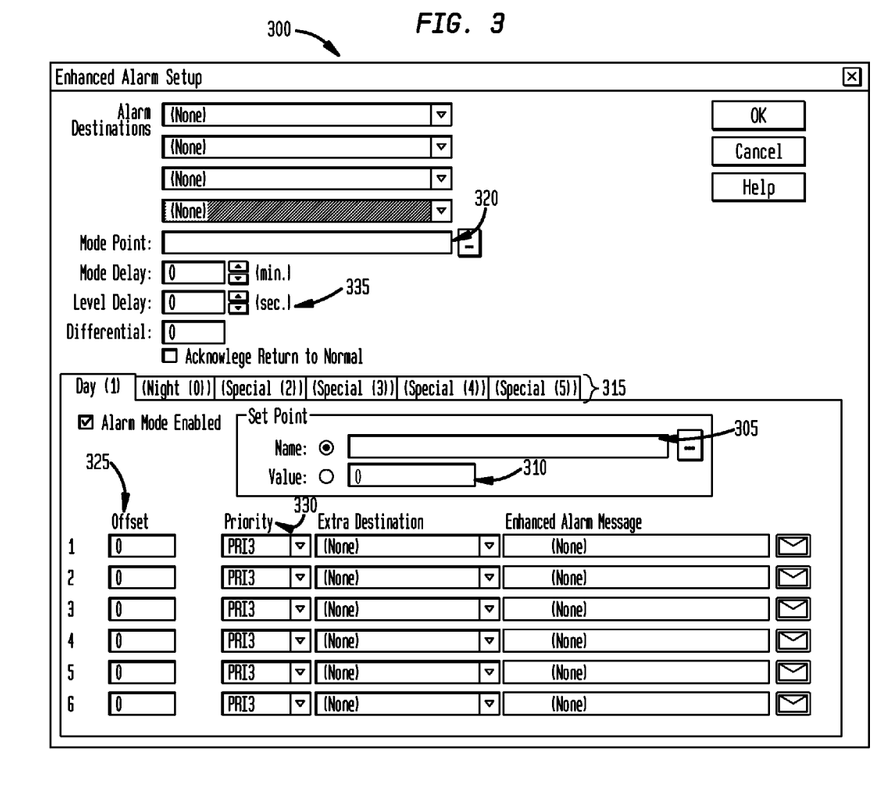
FIG. 3 illustrates an exemplary screen capture of a graphical user interface for setting up enhanced alarming capabilities for a management system in accordance with disclosed embodiments.

FIG. 3 illustrates an exemplary screen capture of a graphical user interface 300 for setting up enhanced alarming capabilities for the management system 100 in accordance with disclosed embodiments. In this illustrative embodiment, graphical user interface 300 enables a user to define parameters for setting up enhanced alarming in management system 100. For example, the alarm manager application 228 may monitor a data point associated with a device associated with a building managed by the management system 100 (e.g., one or more of devices 116, 118, or 120). The alarm manager application 228 may generate alarms according to parameters entered via graphical user interface 300. Graphical user interface 300 may be used to set up enhanced alarming according to a proprietary protocol. Embodiments of the present disclosure enable and support this enhanced alarming on systems and products using the BACnet protocol.

A user may specify the data point to be monitored by name and/or communication path via name 305, and a standard expected set value or set point for the data point may be modified via value 310. In enhanced alarming, different alarm monitoring modes 315 may be enabled to include different rules and parameters for generating and/or handling of alarms. In this example, six different modes 315 may be enabled. These modes 315 may include a day mode, a night mode, and other special modes for certain use under different circumstances. The alarm manager application 228 may determine which of the modes 315 is presently active according to a value of mode point 320, which may be, for example, based on time of day or manually set by an operator.

In enhanced alarming, each of the modes 315 includes multiple offsets 325 for generating an alarm. The offsets 325 may include different conditions (e.g., amount by which a set point has been exceeded, length of time the set point has been exceeded) for generating priorities 330 of an alarm. The priorities 330 include different options for handling an alarm to identifying the severity of an alarm from a building automation point. These different options may include where the alarm is sent and what type of operator message is sent. In this example, six different offsets 325 and priorities 330 may be enabled. In this example, the offsets 325 and priorities 330 may be specified according to an alarming scheme going beyond built-in capabilities of the BACnet protocol.

Embodiments of the present disclosure provide these enhanced alarm capabilities to systems using the BACnet protocol by generating and programming BACnet objects to provide these enhanced alarm capabilities. In one exemplary embodiment, alarm manager application 228 may program six pairs of event enrollment objects and notification class objects and three command objects to provide such enhanced alarm capabilities in monitoring one analog data point associated with the management system 100. For example, alarm manager application 228 may program one pair of event enrollment and notification class objects per offset. Thus, in other embodiments, different numbers of the number of enrollment and notification class objects may be used.

Figure 4:
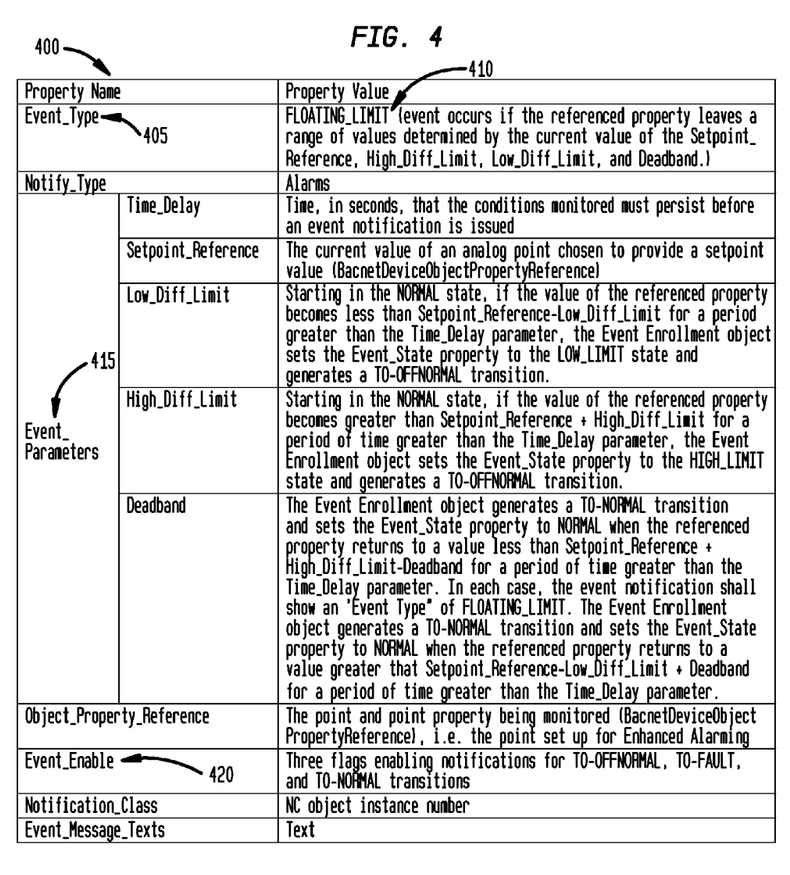
FIG. 4 illustrates an exemplary event enrollment object for enabling enhanced alarming in accordance with disclosed embodiments.

FIG. 4 illustrates an exemplary event enrollment object 400 for enabling enhanced alarming in accordance with disclosed embodiments. As discussed above, in one exemplary embodiment, alarm manager application 228 may program event enrollment objects to monitor and generate alarms based on a value of a data point associated with the management system 100. In BACnet, an event enrollment object 400 is an object that may be able to monitor a value of a data point and generate an alarm when that property's value is outside a defined range or state. In various embodiments, a user or operator may wish to be notified when the property of the device meets a certain condition. For example, a user may wish to be notified when a value for an input or output of the device (such as a temperature sensor) reaches a certain level or is outside of a certain range.

In this illustrative example, event enrollment object 400 is programmed with an event_type 405 using the floating_limit algorithm 410 to generate an event based on a value of a data point and the event_parameters 415. The event enrollment object 400 is mapped to the offsets 325 to provide the alarm generating capabilities specified by the offsets 325 using BACnet. The illustration of the event enrollment object 400 programming in FIG. 4 is for the purpose of providing one example of an event enrollment object 400. For example, a different algorithm 410 and or event_parameters 415 may be programmed to generate an event based on different conditions.

Figure 5:
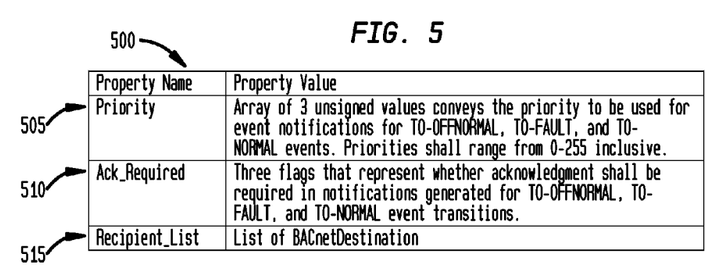
FIG. 5 illustrates an exemplary notification class object for enabling enhanced alarming in accordance with disclosed embodiments.

FIG. 5 illustrates an exemplary notification class object 500 for enabling enhanced alarming in accordance with disclosed embodiments. As discussed above, in one exemplary embodiment, alarm manager application 228 may program six pairs of event enrollment objects 400 and notification class objects 500 to monitor and generate alarms based on a value of a data point associated with the management system 100. Each of the event enrollment objects 400 are paired with a notification class object 500. The notification class objects 500 identify how an alarm is handled and communicated. Similar to the event enrollment objects 400 being mapped to the offsets 325, the notification class objects 500 are mapped to the priorities 330 of the alarm. Thus, when one of the event enrollment objects 400 generates an event, the associated notification class object 500 provides the rules for handling and communicating an alarm for the generated event. In this example embodiment, the notification class objects 500 identify the priority 505 of the alarm, whether or not acknowledgement 510 of the alarm is required, and a recipient list 515 of destinations that will receive the alarm.

In certain proprietary protocols for building automation systems, there are six priority levels for an alarm. Level 1 is for the most critical alarms, and Level 6 is for the least critical alarms. Each priority level may be assigned a unique color to aid in identifying the priority levels. When alarm status receives a point alarm, the alarm may be displayed to an operator with a priority color associated with the alarm condition. In BACnet, alarms have a priority range of 0 to 255. In this embodiment, the alarm manager application 228 maps the BACnet priorities to the six alarm priority levels A1-A6. Table 1 below identifies exemplary range information for alarm priority mapping.

TABLE 1

| Alarm Priority Range | Alarm Priority | Network Priority | Description |
| --- | --- | --- | --- |
| 0-31 | A1 | Life Safety Message | Notifications related to an immediate threat to life, safety, or health. For example, fire detection or medical emergency. |
| 32-63 | A2 | Life Safety Message | Notifications related to an immediate threat to property. For example, a forced entry or unlocked doors. |
| 64-95 | A3 | Critical Equipment Message | Notifications related to improper operation, monitoring failure particular to Life Safety or Property Safety monitoring, or monetary loss. For example, fire sprinkler valve shut |

TABLE 1-continued

| Alarm Priority Range | Alarm Priority | Network Priority | Description |
| --- | --- | --- | --- |
| | | | off, communication failure, and excessive energy use. |
| 96-127 | A4 | Critical Equipment Message | Notifications related to communication failure particular to Life Safety or Property Safety equipment. |
| 128-191 | A5 | Urgent Message | Higher-level notifications related to occupant discomfort, normal operation, normal monitoring, or return to normal. For example, normal event logging or room temperature above setpoint. |
| 192-255 | A6 | Normal Message | Lower-level notifications related to occupant discomfort, normal operation, normal monitoring, or return to normal. For example, normal event logging or room temperature above setpoint. |

FIGS. 6A-6C illustrate exemplary command objects 600, 605, and 610 for enabling enhanced alarming in accordance with disclosed embodiments. As discussed above, embodiments of the present disclosure use six pairs of event enrollment object 400 and notification class object 500 pairs in connection with three command objects 600, 605, and 610 to provide such enhanced alarm capabilities in monitoring a data point associated with the management system 100. In this illustrative embodiment, FIG. 6A illustrates exemplary programming for property names and values for command object 600, FIG. 6B illustrates exemplary programming for property names and values for command object 605, and FIG. 6C illustrates exemplary programming for property names and values for command object 610.

In this illustrative embodiment, the alarm manager application 228 uses command objects 600, 605, and 610 to write and/or program the property values of the pairs of event enrollment objects 400 and notification class objects 500 between each of the modes 315. For example, as discussed above, the value of the mode point 320 identifies which mode is active. In BACnet, the present value properties 615, 620, and 625 of the command objects 600, 605, and 610 are written to select which mode is active. The alarm manager application 228 then uses the command objects 600, 605, and 610 to write and/or program the appropriate property values of the pairs of event enrollment objects 400 and notification class objects 500 for the active mode. For example, the alarm manager application 228 may change duration or amount values for generating an event, notification lists for alarms, and/or priority values for an alarm when the active mode is changed based on the programming of the command objects 600, 605, and 610. The command objects 600, 605, and 610 each include an action property 630, 635, and 640, which is an array of BACnet action lists for each mode (e.g., six action lists in this embodiment). Each action list contains the BACnet action commands alarm manager application 228 uses to program the pairs of event enrollment/notification class objects according to the active mode.

In this illustrative embodiment, alarm manager application 228 uses three command objects. The alarm manager application 228 uses command objects 605 and 610 to program the event enrollment/notification class pairs of objects, in this example, six pairs. The alarm manager application 228 uses command object 605 to set the event enable property 420 of the event enrollment objects 400 to 'false'. The alarm manager application 228 uses command object 610 to set the event enable property 420 in the event enrollment objects 400 to 'true'. The command object 605 is intended to be triggered immediately when the mode changes. The command object 610 is intended to be triggered after command object 605 by a time delay equal to the level delay value 335. The alarm manager application 228 accomplishes this by setting up command object 600 to write to the present value properties 620 and 625 of command objects 605 and 610, respectively, with a time delay between the two writes. The alarm manager application 228 enters the time delay value in a Post_Delay component of the BACnet action command for the command object 600 used to trigger command object 610. Table 2 below illustrates an exemplary action list for command object 600 compared with a related enhanced alarming setting from a proprietary protocol in accordance with an exemplary embodiment. An additional action list may be utilized for each different mode 315.

TABLE 2

| Action Command | Object Type | Property | Value | Related Enhanced Alarming Setting |
|---|---|---|---|---|
| Writes new mode value to Present_Value property of Command Object #2 | Command | Present_Value | Mode value (1..6) | Mode change |
| Writes new mode value to Present_Value property of Command Object #3 | Command | Present_Value | Mode value (1..6) | Mode change |

Once triggered, the alarm manager application 228 uses the action lists of the command object 605 to write and/or program the property values of the pairs of event enrollment objects 400 and notification class objects 500 for the active mode 315. Table 3 below illustrates one exemplary action list for command object 605 compared with a related enhanced alarming setting from a proprietary protocol in accordance with an exemplary embodiment. An additional action list may be utilized for each different mode 315.

TABLE 3

| Action Command | Object Type | Property | Value | Related Enhanced Alarming Setting |
|---|---|---|---|---|
| Enables Alarm Mode (setting common to all six EE objects) | Event Enrollment | Event_Enable | False | Alarm Mode Enabled |
| Identifies Setpoint point (setting common to all six EE objects) | Event Enrollment | Setpoint_Reference | BACnet Device Object Property Reference | Set Point (Name) |
| Defines present value of Setpoint point if Set Point is fixed (setting common to all six EE objects) | Analog Value Point | Present_Value | Real | Set Point (Value) |
| Defines Offset (EE object specific setting) | Event Enrollment | Low_Diff_Limit and High_Diff_Limit | Real | Offset |
| Defines Priority (EE object specific setting) | Notification Class (associated with EE object) | Priority | Array of 3 unsigned values ranging from 0-255 inclusive | Priority (1..6) |
| Defines Extra Destination (EE object specific setting) | Notification Class (associated with EE object) | Recipient_List | BACnet Destination | Extra Destination |
| Defines Enhanced Alarm Message (EE object specific setting) | Event Enrollment | Event_Message_Texts | Three text strings | Enhanced Alarm Message |

Once the property values for the pairs are written as discussed above, the alarm manager application 228 uses the action lists of the command object 610 to enable the property values for the event enrollment/notification class object pairs by setting the value of the Event Enrollment object event enable property to true. Table 4 below illustrates an exemplary action list for command object 610 compared with a related enhanced alarming setting from a proprietary protocol in accordance with an exemplary embodiment. An additional action list may be utilized for each different mode 315.

TABLE 4

| Action Command | Object Type | Property | Value | Related Enhanced Alarming Setting |
|---|---|---|---|---|
| Enables Alarm Mode (setting common to all six EE objects) | Event Enrollment | Event_Enable | True | Alarm Mode Enabled |

The programming and number of the event enrollment objects 400, notification class objects 500, command objects 600, 605, and 610, and associated action lists are for the purpose of illustrating one implementation of the principles of the present disclosure and are not a limitation on the various embodiments of the present disclosure. For example, any number of event enrollment objects 400, notification class objects 500, command objects 600, 605, and 610, and associated action lists may be used. Moreover, additional or alternative programming may be used for any of the event enrollment objects 400, notification class objects 500, command objects 600, 605, and 610, and associated action lists.

Figure 7:
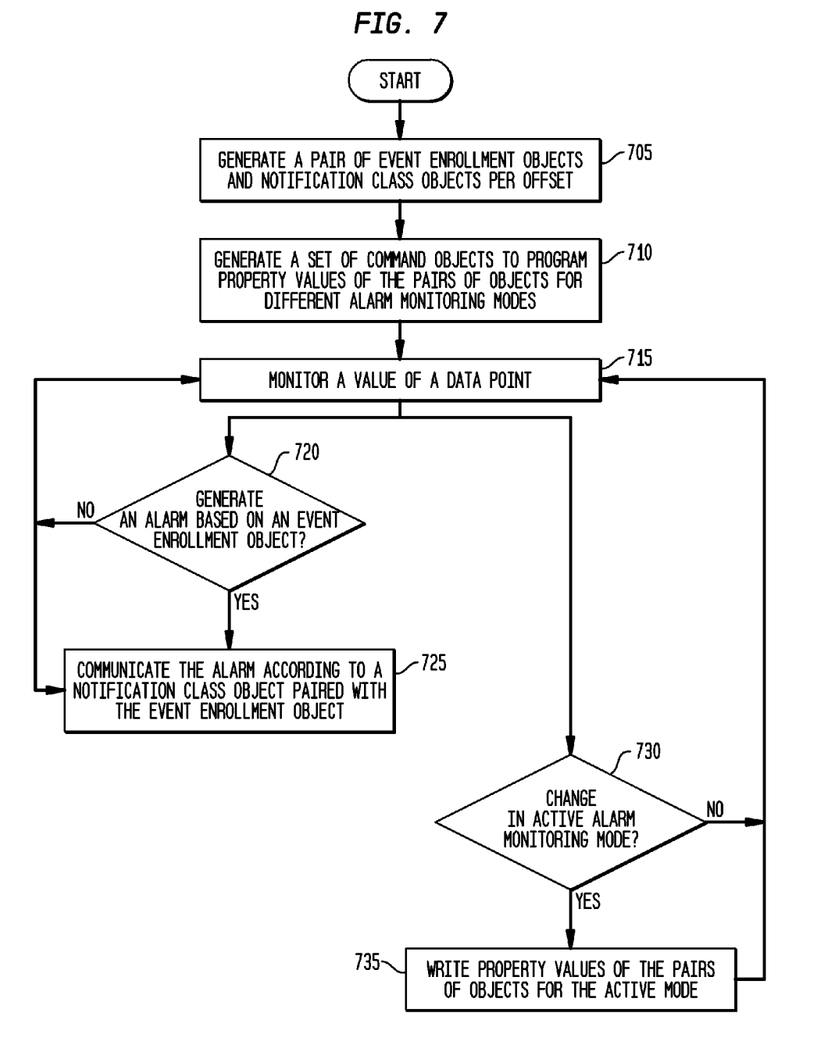
FIG. 7 illustrates a flowchart of a process for enabling enhanced alarming in a management system using BACnet objects in accordance with disclosed embodiments.

FIG. 7 depicts a flowchart of a process for enabling enhanced alarming in a management system using BACnet objects in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that causes one or more data processing systems to perform such a process. For example, the alarm manager application 228 may comprise the executable instructions to cause one or more data processing systems to perform such a process.

The process begins with the system generating a pair of event enrollment objects and notification class objects per offset (step 705). In step 705, the system may generate and program an enrollment object and notification class object as described above with regard to event enrollment object 400 and notification class object 500. The system may generate an enrollment object and notification class object pair for each offset 325 available using proprietary enhanced alarming protocols to provide enhanced alarming functionality using BACnet objects.

The system generates a set of command objects to program property values of the pairs of objects for different alarm monitoring modes (step 710). In step 710, the system may generate and program command objects as described above with regard to command objects 600, 605, and 610. The system may generate the command objects to program property values of the pairs of event enrollment/notification objects based on which of a plurality of modes is active to provide different mode options that are included with enhanced alarming using BACnet objects.

The system monitors a value of a data point (step 715). In step 715, the system may monitor a value of a data point of one of the devices 116, 118, and 120 associated with a building managed by the management system.

The system determines whether to generate an alarm based on an event enrollment object (step 720). In step 720, the system may use the event enrollment objects, for example, all the event enrollment objects that monitor the data point simultaneously, generated to determine whether to generate the alarm based on the value of a data point and the property values of the event enrollment objects. For example, the system may generate an alarm if the value exceeds or drops below a set point by a threshold amount, remains beyond the set point for a threshold time, and/or when other conditions provided by the property values of the event enrollment objects are met. Ideally, only one event enrollment object is intended to trigger at a time based on the value of the data point present value property. Practically, there may be more than one event enrollment object triggered at a time because of overlap between two offsets. If an alarm in not generated, the system continues to monitor the value of the data point without generating an alarm at this time.

If an alarm is generated, the system communicates the alarm according to a notification class object paired with the event enrollment object (step 725). In step 725, the system may determine how to handle and communicate the alarm based on the property values of the notification class object 500 that is paired with the event enrollment object 400 for which the alarm was generated. For example, the system may determine a priority level for the alarm, whether acknowledgement of the alarm is required, and a distribution list for receipts of the notification of the alarm, and handle the alarm in accordance with such rules.

In connection with the monitoring of the value of the data point for generation of an alarm, the system determines whether a change in active alarm monitoring mode is detected (step 730). In step 730, the system may determine whether the active mode has changed based on the present value 615 of the command object 600. For example, the active mode may be changed based on time of day (e.g., a night mode versus a day mode) or whether an operator manually changed the active mode to a special mode (such as for maintenance). The system may monitor for a change in active mode at the same time that the system monitors for whether to generate an alarm.

If the system determines that the active alarm monitoring mode has changed, the system writes the property values of the pairs of objects for the active mode (step 735). In step 735, the system may change the property values pairs of objects from a previously active mode to appropriate property values for the currently active mode using the command objects 600, 605, and 610. In this manner, the system enables enhanced alarming features and functionality using BACnet objects based on a different set of user defined mode specific parameters. If the system determines that the active alarm monitoring mode has not changed, the system continues to monitor the value of the data point and monitor for whether the active alarm monitoring mode has changed.

Disclosed embodiments provide enhanced alarming in a building management system using BACnet objects. Disclosed embodiments provide users with the ability to include parameters for enhanced alarming using offsets and support and enable the enhanced alarming using a selection and programming of BACnet objects. Disclosed embodiments use pairs of event enrollment objects and notification class objects to generate and communicate alarms with enhanced alarming functionality based on the value of a monitored data point and use command objects to provide multimode enhanced alarming functionality based on the value of the mode point.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums, such as read only memories (ROMs) or erasable, electrically programmable read only memories (EEPROMs), and user-recordable type mediums, such as floppy disks, hard disk drives, and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method in a data processing system, the method comprising:
    monitoring a value of a data point associated with a device in an automation system using a set of pairs of event enrollment objects and notification class objects configuring and communicating an alarm,
    for each pair of objects, the first of the pair defined according to a first protocol, and the second of the pair corresponding to one of a set of offsets defined according to a second protocol;
    writing property values of the pairs of objects for different alarm monitoring modes using a set of command objects; and
    in response to detecting the value for the data point meeting conditions in at least one of the event enrollment objects, generating and communicating an alarm according to a notification class object paired with the at least one event enrollment object,
    wherein the first protocol and the second protocol are different building automation communication protocols,
    wherein the first protocol is building automation and controls network (BACnet) protocol,
    wherein the second protocol is a proprietary protocol for configuring and communicating alarms, and
    wherein writing the property values of the pairs of objects for the different alarm monitoring modes comprises, in response to a change in which of the alarm monitoring modes is active, changing one or more of the property values of the pairs of objects using the set of command objects.

2. The method of claim 1, further comprising identifying which of the alarm monitoring modes is active using a present value property of at least one of the command objects.

3. The method of claim 1, wherein the alarm monitoring modes include different rules for generating an alarm according to which of the alarm monitoring modes is active.

4. The method of claim 1, wherein the offsets include different priority levels for urgency of an alarm, different notification destinations, and different operator messages.

5. The method of claim 1, wherein monitoring the value of the data point comprises using a floating limit algorithm in the event enrollment objects to monitor the value.

6. The method of claim 1, wherein values of the first protocol are mapped to values of the second protocol.

7. A data processing system comprising:
    a storage device comprising an alarm manager application;
    an accessible memory comprising instructions of the alarm manager application; and
    a processor executes the instructions of the alarm manager application to:
        monitor a value of a data point associated with a device in an automation system using a set of pairs of event enrollment objects and notification class objects configuring and communicating an alarm,
        for each pairs of objects, the first of the pair defined according to a first protocol and the second of the pair corresponding to one of a set of offsets defined according to a second protocol;
        write property values of the pairs of objects for different alarm monitoring modes using a set of command objects; and
        generate and communicate, in response to detecting the value for the data point meeting conditions in at least one of the event enrollment objects, an alarm according to a notification class object paired with the at least one event enrollment object,
    wherein the first protocol and the second protocol are different building automation communication protocols,
    wherein the first protocol is building automation and controls network (BACnet) protocol,
    wherein the second protocol is a proprietary protocol for configuring and communicating alarms, and
    wherein to write the property values of the pairs of objects for the different alarm monitoring modes, the processor executes the instructions of the alarm manager application to change, in response to a change in which of the alarm monitoring modes is active, one or more of the property values of the pairs of objects using the set of command objects.

8. The data processing system of claim 7, wherein the processor executes the instructions of the alarm manager application to identify which of the alarm monitoring modes is active using a present value property of at least one of the command objects.

9. The data processing system of claim 7, wherein the alarm monitoring modes include different rules for generating an alarm according to which of the alarm monitoring modes is active.

10. The data processing system of claim 7, wherein the offsets include different priority levels for urgency of an alarm, different notification destinations, and different operator messages.

11. The data processing system of claim 7, wherein the processor uses a floating limit algorithm in the event enrollment objects to monitor the value.

12. The data processing system of claim 7,
    wherein values of the first protocol are mapped to values of the second protocol.

13. A non-transitory computer-readable medium encoded with executable instructions that, when executed, cause one or more data processing systems to:
    monitor a value of a data point associated with a device in an automation system using a set of pairs of event enrollment objects and notification class objects configuring and communicating an alarm according,
    for each pair of objects, the first of the pair defined according to a first protocol, and the second of the pairs corresponding to one of a set of offsets defined according to a second protocol;

write property values of the pairs of objects for different alarm monitoring modes using a set of command objects;

generate and communicate, in response to detecting the value for the data point meeting conditions in at least one of the event enrollment objects, an alarm according to a notification class object paired with the at least one event enrollment object, wherein the first protocol and the second protocol are different building automation communication protocols, wherein the first protocol is building automation and controls network (BACnet) protocol, and wherein the second protocol is a proprietary protocol for generating and communicating alarms, and, wherein the instructions that cause the one or more data processing systems to write the property values of the pairs of objects for the different alarm monitoring modes comprise instructions that cause the one or more data processing systems to change, in response to a change in which of the alarm monitoring modes is active, one or more of the property values of the pairs of objects using the set of command objects.

14. The non-transitory computer-readable medium of claim 13, wherein the computer-readable medium is further encoded with executable instructions that, when executed, cause one or more data processing systems to identify which of the alarm monitoring modes is active using a present value property of at least one of the command objects.

15. The non-transitory computer-readable medium of claim 13, wherein the alarm monitoring modes include different rules for generating an alarm according to which of the alarm monitoring modes is active.

16. The non-transitory computer-readable medium of claim 13, wherein the offsets include different priority levels for urgency of an alarm, different notification destinations, and different operator messages.

17. The non-transitory computer-readable medium of claim 13,
wherein values of the first protocol are mapped to values of the second protocol.

18. A method in a data processing system, the method comprising:
monitoring a value of a data point associated with a device in an automation system using a set of pairs of event enrollment objects and notification class objects configuring and communicating an alarm, for each pair of objects, the first of the pair defined according to a first protocol, and the second of the pair corresponding to one of a set of offsets defined according to a second protocol;

writing property values of the pairs of objects for different alarm monitoring modes using a set of command objects; and in response to detecting the value for the data point meeting conditions in at least one of the event enrollment objects, generating and communicating an alarm according to a notification class object paired with the at least one event enrollment object, wherein the first protocol and the second protocol are different building automation communication protocols, wherein the first protocol is building automation and controls network (BACnet) protocol, wherein the second protocol is a proprietary protocol for generating and communicating alarms, and wherein the offsets include different priority levels for urgency of an alarm, different notification destinations, and different operator messages.

19. The method of claim 18, further comprising identifying which of the alarm monitoring modes is active using a present value property of at least one of the command objects.

20. The method of claim 18, wherein the alarm monitoring modes include different rules for generating an alarm according to which of the alarm monitoring modes is active.

21. The method of claim 18, wherein monitoring the value of the data point comprises using a floating limit algorithm in the event enrollment objects to monitor the value.

22. A data processing system comprising:
a storage device comprising an alarm manager application;
an accessible memory comprising instructions of the alarm manager application; and
a processor executes the instructions of the alarm manager application to:
monitor a value of a data point associated with a device in an automation system using a set of pairs of event enrollment objects and notification class objects configuring and communicating an alarm, for each pairs of objects, the first of the pair defined according to a first protocol and the second of the pair corresponding to one of a set of offsets defined according to a second protocol;

write property values of the pairs of objects for different alarm monitoring modes using a set of command objects; and generate and communicate, in response to detecting the value for the data point meeting conditions in at least one of the event enrollment objects, an alarm according to a notification class object paired with the at least one event enrollment object, wherein the first protocol and the second protocol are different building automation communication protocols, wherein the first protocol is building automation and controls network (BACnet) protocol, wherein the second protocol is a proprietary protocol for generating and communicating alarms, and wherein the offsets include different priority levels for urgency of an alarm, different notification destinations, and different operator messages.

23. The data processing system of claim 22, wherein the processor executes the instructions of the alarm manager application to identify which of the alarm monitoring modes is active using a present value property of at least one of the command objects.

24. The data processing system of claim 22, wherein the alarm monitoring modes include different rules for generating an alarm according to which of the alarm monitoring modes is active.

25. The data processing system of claim 22, wherein the processor uses a floating limit algorithm in the event enrollment objects to monitor the value.

* * * * *